United States Patent
Lee et al.

(10) Patent No.: US 8,495,677 B2
(45) Date of Patent: Jul. 23, 2013

(54) BROADCASTING RECEIVING APPARATUS AND CONTROL METHOD THEREOF

(75) Inventors: Hyeon-ji Lee, Suwon-si (KR); Joon-hwan Kim, Yongin-si (KR); Chang-soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 12/164,387

(22) Filed: Jun. 30, 2008

(65) Prior Publication Data

US 2009/0083793 A1    Mar. 26, 2009

(30) Foreign Application Priority Data

Sep. 21, 2007   (KR) .................. 10-2007-0096681

(51) Int. Cl.
*H04N 5/445*   (2011.01)
*H04N 7/173*   (2011.01)

(52) U.S. Cl.
USPC ............... 725/39; 725/45; 725/49; 725/50; 725/100

(58) Field of Classification Search
USPC ................. 725/39, 45, 49, 50, 100
See application file for complete search history.

(56) References Cited

U.S. PATENT DOCUMENTS

| | | | | |
|---|---|---|---|---|
| 6,021,419 A * | 2/2000 | Clarke et al. | ............. | 708/300 |
| 6,061,419 A * | 5/2000 | Hsieh et al. | ............. | 378/4 |
| 6,128,009 A | 10/2000 | Ohkura et al. | | |
| 7,047,547 B2 * | 5/2006 | Alten et al. | ............. | 725/28 |
| 7,174,126 B2 * | 2/2007 | McElhatten et al. | ......... | 455/3.04 |
| 7,690,012 B2 * | 3/2010 | Luehrs | ............. | 725/28 |
| 2002/0010922 A1 | 1/2002 | Darin et al. | | |
| 2002/0056104 A1 | 5/2002 | Burnhouse et al. | | |
| 2003/0088870 A1 | 5/2003 | Wang | | |
| 2003/0163811 A1 * | 8/2003 | Luehrs | ............. | 725/25 |
| 2004/0040039 A1 * | 2/2004 | Bernier | ............. | 725/46 |
| 2004/0060063 A1 * | 3/2004 | Russ et al. | ............. | 725/46 |
| 2006/0013555 A1 | 1/2006 | Poslinski | | |
| 2006/0075420 A1 * | 4/2006 | Ludvig et al. | ............. | 725/9 |
| 2006/0095937 A1 | 5/2006 | Knudson et al. | | |
| 2007/0220580 A1 | 9/2007 | Putterman et al. | | |
| 2010/0138873 A1 * | 6/2010 | Terada et al. | ............. | 725/56 |

FOREIGN PATENT DOCUMENTS

| | | |
|---|---|---|
| EP | 1 569 446 A1 | 8/2005 |
| KR | 100429221 | 4/2004 |
| KR | 1020050081288 A | 8/2005 |
| KR | 1020060063366 A | 6/2006 |

OTHER PUBLICATIONS

Communication dated May 28, 2009 issued by the European Patent Office in counterpart European Application No. 08162632.7.
Communicaiton, dated Apr. 4, 2012, issued by the European Patent Office in corresponding European Application No. 08162632.7.

* cited by examiner

*Primary Examiner* — Kieu Oanh T Bui
(74) *Attorney, Agent, or Firm* — Sughrue Mion, PLLC (57) ABSTRACT

A broadcasting receiving apparatus includes: a receiver which receives a broadcasting signal of one of a plurality of broadcasting channels, the broadcasting channels belonging to at least one of a plurality of channel categories; and a controller which deletes a broadcasting channel having the channel category selected by a user from a memory channel group including memory broadcasting channels among the plurality of the broadcasting channels, and controls the receiver to receive a broadcasting signal of one of the broadcasting channels selected by a user from the memory channel group excluding the broadcasting channel.

23 Claims, 6 Drawing Sheets

BROADCASTING RECEIVING APPARATUS AND CONTROL METHOD THEREOF

CROSS-REFERENCE TO RELATED APPLICATION

This application claims priority from Korean Patent Application No. 10-2007-0096681, filed on Sep. 21, 2007, in the Korean Intellectual Property Office, the disclosure of which is incorporated herein by reference.

BACKGROUND OF THE INVENTION

1. Field of the Invention

Apparatuses and methods consistent with the present invention relate to a broadcasting receiving apparatus and a control method thereof, and more particularly, to a broadcasting receiving apparatus which edits a broadcasting channel by a user, and a control method thereof.

2. Description of the Related Art

A broadcasting receiving apparatus such as a TV and a set-top box may edit a broadcasting channel. The broadcasting receiving apparatus may delete a part of a plurality of broadcasting channels or add a new broadcasting channel thereto by a user. More specifically, the broadcasting receiving apparatus stores a memory channel group including memory broadcasting channels among the plurality of broadcasting channels. If a user selects a particular broadcasting channel through a user interface (UI) to delete the channel, the broadcasting receiving apparatus deletes the concerned broadcasting channel from the memory channel group.

Figure 1A:
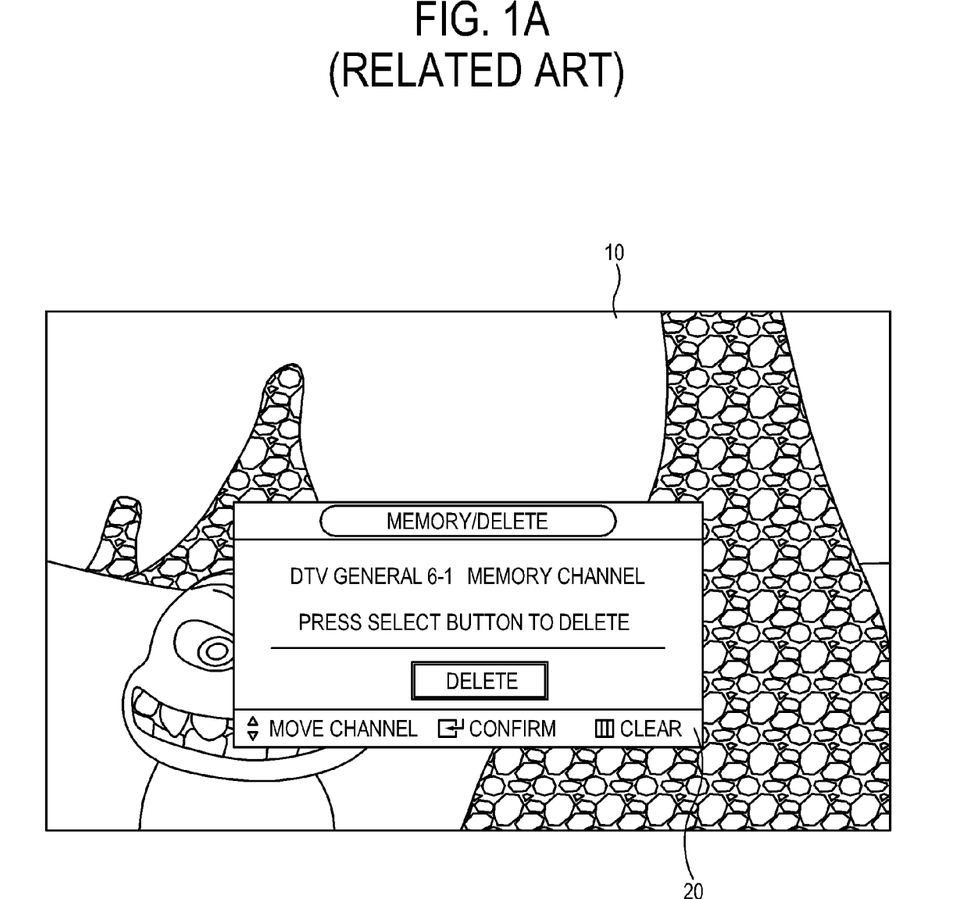
FIGS. 1A and 1B illustrate a UI of a conventional broadcasting receiving apparatus.
Figure 1B:
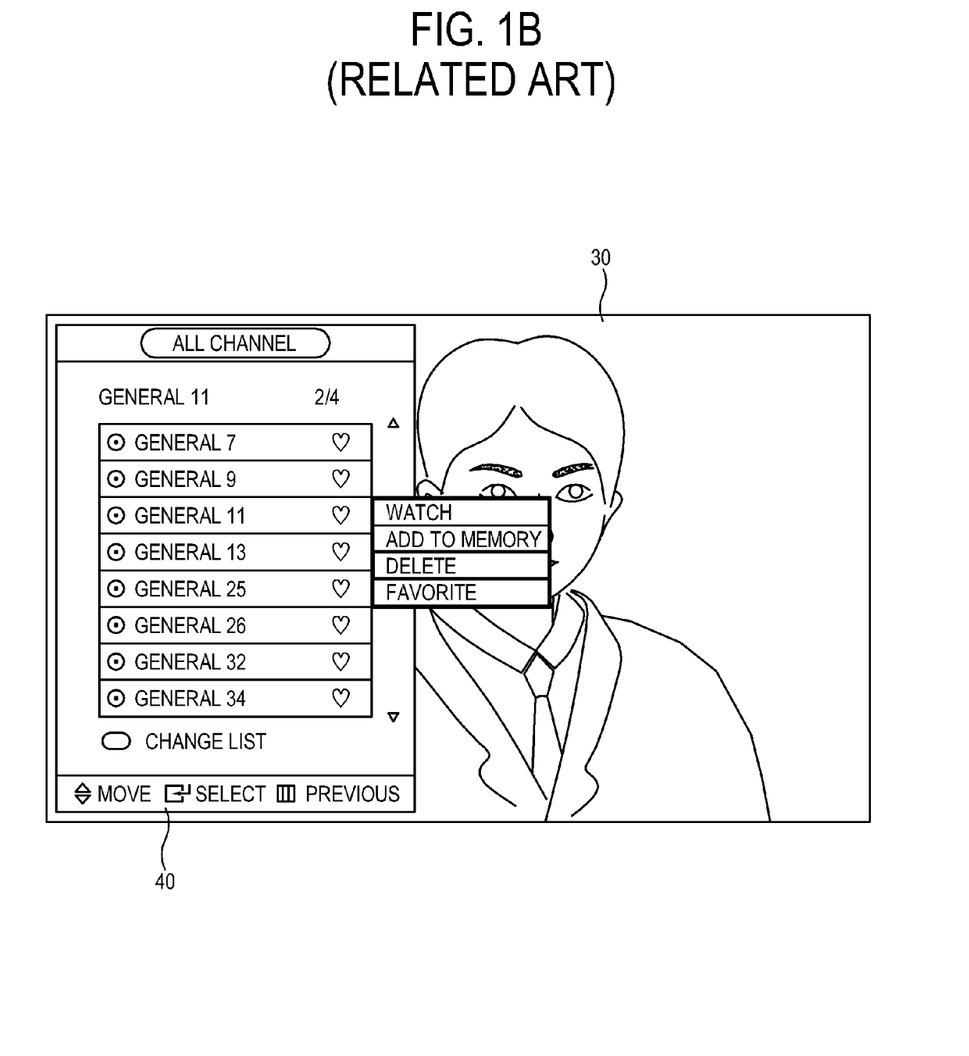

As shown in FIG. 1A, a conventional broadcasting receiving apparatus may provide a UI 20 as an OSD (on screen display) to delete the currently-viewing broadcasting channel on a screen 10 displaying the broadcasting channel. As shown in FIG. 1B, the conventional broadcasting receiving apparatus may provide an overall broadcasting channel list 40 to process the broadcasting channel selected by a user.

If a user wants to delete a plurality of broadcasting channels from the conventional broadcasting receiving apparatus, he/she may individually select each broadcasting channel to delete it or select each broadcasting channel from the broadcasting channel list to delete it.

If the memory channel group is formed according to a channel category, a user should add each broadcasting channel to form the memory channel group.

SUMMARY OF THE INVENTION

Accordingly, it is an aspect of the present invention to provide a broadcasting receiving apparatus which edits a broadcasting channel more conveniently, and a control method thereof.

Also, it is another aspect of the present invention to provide a broadcasting receiving apparatus which forms a memory channel group according to a channel category by using EPG (electronic program guide) information included in a broadcasting signal, and a control method thereof.

Additional aspects of the present invention will be set forth in part in the description which follows and, in part, will be obvious from the description, or may be learned by practice of the present invention.

The foregoing and/or other aspects of the present invention are also achieved by providing a broadcasting receiving apparatus, comprising: a receiver which receives a broadcasting signal of one of a plurality of broadcasting channels, the broadcasting channels belonging to at least one of a plurality of channel categories; and a controller which deletes a broadcasting channel having the channel category selected by a user from a memory channel group including memory broadcasting channels among the plurality of the broadcasting channels, and controls the receiver to receive a broadcasting signal of one of the broadcasting channels selected by a user from the memory channel group excluding the broadcasting channel.

The broadcasting receiving apparatus may further comprise a user interface (UI) generator which generates a UI to select one of the plurality of channel categories by a user.

The controller may add a part of the plurality of broadcasting channels to the memory channel group according to the plurality of channel categories, based on additional information included in the broadcasting signal.

The broadcasting receiving apparatus may further comprise a user input unit which receives a user's command, wherein the controller selects one of the plurality of channel categories according to the user's command.

The controller may add a part of the plurality of broadcasting channels to the memory channel group according to the user's command.

The controller may delete a part of the plurality of broadcasting channels from the memory channel group according to the user's command.

The broadcasting receiving apparatus may further comprise a storage unit which stores the memory channel group therein.

The broadcasting receiving apparatus may further comprise an image processor which processes the broadcasting signal.

The broadcasting receiving apparatus may further comprise a display unit which displays an image processed by the image processor.

The channel categories may be provided according to a genre.

The foregoing and/or other aspects of the present invention are also achieved by providing a control method of a broadcasting receiving apparatus which receives a broadcasting signal of one of a plurality of broadcasting channels, the broadcasting channels belonging to at least one of a plurality of channel categories, the control method comprising: deleting a broadcasting channel having the channel category selected by a user from a memory channel group including memory broadcasting channels among the plurality of broadcasting channels; and receiving a broadcasting signal of the broadcasting channel selected by a user from the memory channel group excluding the broadcasting channel.

The control method may further comprise generating a user interface (UI) to select one of the plurality of channel categories by a user.

The control method may further comprise adding a part of the plurality of broadcasting channels to the memory channel group according to the plurality of channel categories, based on additional information included in the broadcasting signal.

The control method may further may comprise selecting one of the plurality of channel categories according to the user's command.

The control method may further comprise adding a part of the plurality of broadcasting channels to the memory channel group according to the user's command.

The control method may further comprise deleting a part of the plurality of broadcasting channels from the memory channel group according to the user's command.

The control method may further comprise storing the memory channel group.

The control method may further comprise processing the broadcasting signal.

The control method may further comprise displaying the processed image.

The channel categories may be provided according to a genre.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 2:
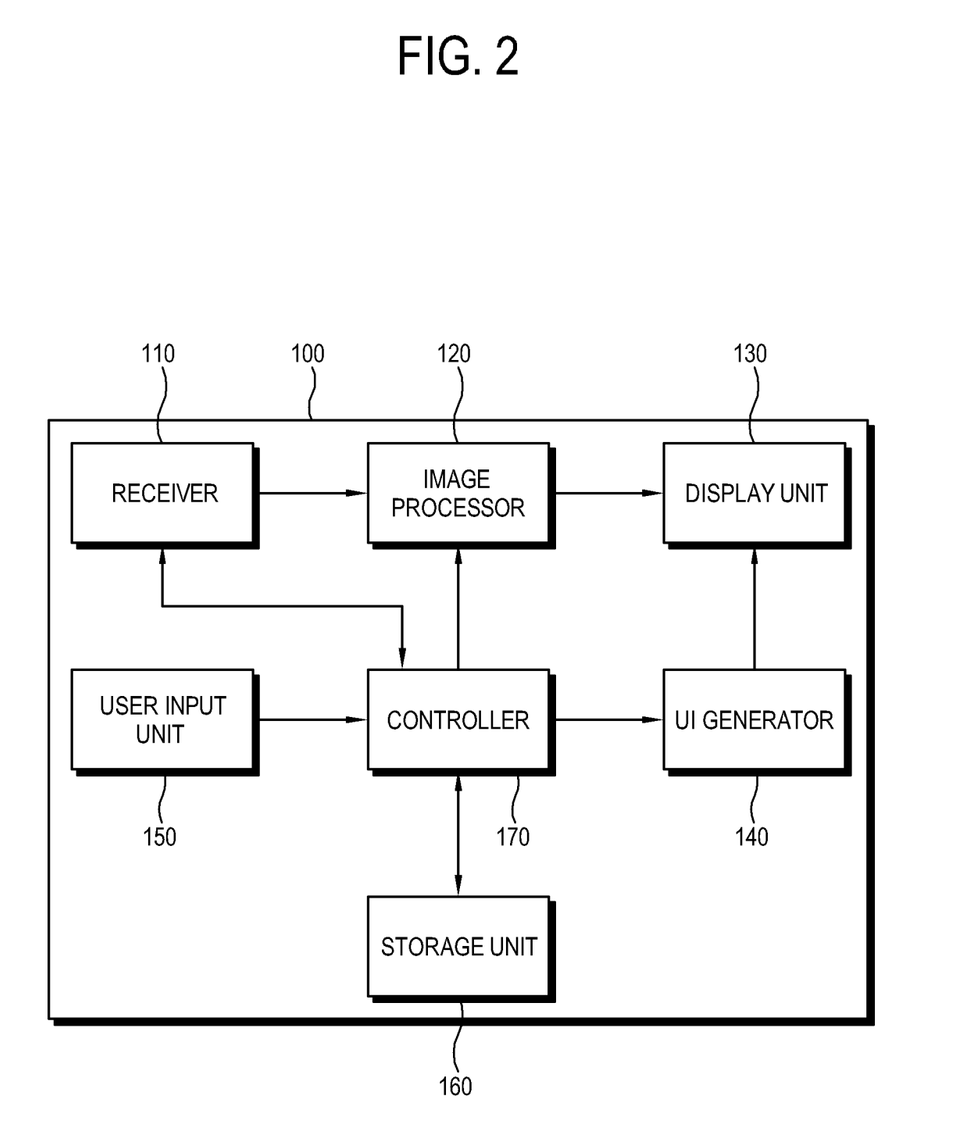
FIG. 2 is a block diagram of a broadcasting receiving apparatus according to an exemplary embodiment of the present invention.

FIG. 2 is a block diagram of a broadcasting receiving apparatus 100 according to an exemplary embodiment of the present invention. The broadcasting receiving apparatus 100 according to the exemplary embodiment of the present invention allows a user to edit a broadcasting channel. For example, the broadcasting receiving apparatus 100 may include a TV or a set-top box and delete a broadcasting channel from a plurality of broadcasting channels or add a new broadcasting channel thereto.

As shown therein, the broadcasting receiving apparatus 100 may include a receiver 110, an image processor 120, a display unit 130, a UI (user interface) generator 140, a user input unit 150, a storage unit 160 and a controller 170.

The receiver 110 receives a broadcasting signal of one of the plurality of broadcasting channels. The plurality of broadcasting channels has at least one of a plurality of channel categories. The channel categories may be set based on a genre, broadcasting station or age. For example, the plurality of broadcasting channels may be classified as movie channels, sports channels, entertainment channels and home shopping channels according to the channel category of a genre.

The receiver 110 may receive a broadcasting signal transmitted by a broadcasting station through an antenna or a cable. The broadcasting signal may include service information (SI) and program specific information (PSI) as additional information about the content of each broadcasting channel. The broadcasting receiving apparatus 100 may display electronic program guide (EPG) with SI and PSI. The EPG includes genres, broadcasting stations, synopses, schedules, etc. of broadcasting programs. The receiver 110 may include a tuner to tune one of the plurality of broadcasting channels.

The image processor 120 processes a received broadcasting signal of the broadcasting channel. The image processor 120 processes an image signal included in the broadcasting signal, and provides an image of the broadcasting channel.

The display unit 130 displays the image processed by the image processor 120. The display unit 130 may include a cathode ray tube (CRT), a liquid crystal display (LCD), a plasma display panel (PDP), etc.

Figure 3:
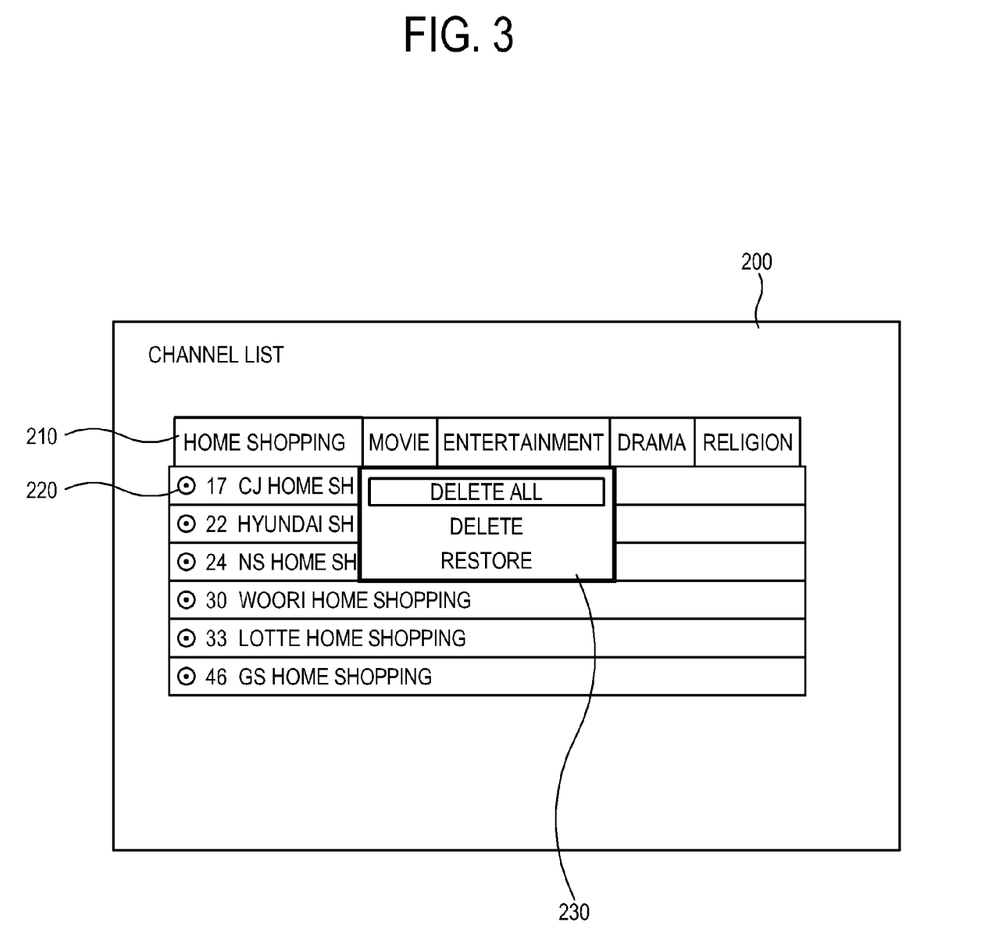
FIG. 3 illustrates a UI of the broadcasting receiving apparatus according to the exemplary embodiment of the present invention.

The UI generator 140 generates a UI to allow a user to select one of the plurality of channel categories. As shown in FIG. 3, a UI 200 according to the exemplary embodiment of the present invention displays a genre list 210 including genres like home shopping, movie, entertainment, drama and religion. Each genre includes a plurality of broadcasting channel list 220. A command window 230 is displayed to receive a user's command. If a user selects the genre of home shopping, the broadcasting channel list 220 including home shopping channels is displayed. If a user selects an item "delete all" from the command window 230, all of the home shopping channels are deleted.

The user input unit 150 receives a user's command. For example, the user input unit 150 may include a remote controller or an input key of a TV.

The storage unit 160 stores a memory channel group therein. The memory channel group includes memory broadcasting channels, i.e., broadcasting channels that are associated with the memory channel group. In an exemplary embodiment, the association of the broadcasting channels to the memory channel group may be predetermined. The memory broadcasting channels may be automatically included in the memory channel group according to channel category based on the additional information, or user selection. Preferably, the storage unit 160 includes a non-volatile memory.

The controller 170 deletes the broadcasting channel having the channel category selected by a user from the memory channel group including the memory broadcasting channels, among the plurality of broadcasting channels, and controls the receiver 110 to receive a broadcasting signal of a broadcasting channel selected by a user from the memory channel group excluding the deleted broadcasting channel. The memory channel group is a database of viewable broadcasting channels of the plurality of broadcasting channels. That is, the controller 170 controls the receiver 110 to receive a broadcasting signal of the broadcasting channel included in the memory channel group and not to receive a broadcasting signal of the broadcasting channel deleted from the memory channel group.

For example, a user may not want to view home shopping channels among broadcasting channels Nos. 1 to 100. Then, a user may delete the home shopping channels from the memory channel group not to receive the broadcasting signal of the deleted broadcasting channels.

The controller 170 may add a part of the plurality of broadcasting channels to the memory channel group according to the plurality of channel categories, based on the additional information included in the broadcasting signal. The additional information may include SI and PSI of the broadcasting signal. Then, the broadcasting receiving apparatus 100 may automatically form the memory channel group according to the channel categories, with the additional information of the broadcasting signal.

The controller 170 may select one of the plurality of channel categories, add a part of the plurality of broadcasting channels to the memory channel group and delete a part of the plurality of broadcasting channels from the memory channel group according to a user's command.

As shown in FIG. 3, a user may select one of home shopping, movie, entertainment, drama and religion through the UI 200 as the concerned channel category. A user may add a desired broadcasting channel to the respective channel categories or delete the broadcasting channel therefrom. The UI 200 may provide menus to delete all channels from the concerned channel category, to delete a certain channel or restore the deleted channels through the command window 230.

Figure 4:
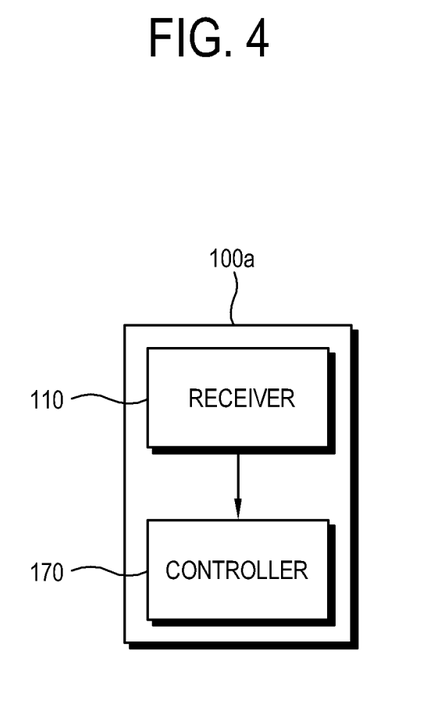
FIG. 4 is a block diagram of a broadcasting receiving apparatus according to another exemplary embodiment of the present invention.

FIG. 4 is a block diagram of a broadcasting receiving apparatus 100A according to another exemplary embodiment of the present invention. As shown therein, the broadcasting receiving apparatus 100A may include a receiver 110 and a controller 170. Repetitive or similar configurations will not be described here.

Figure 5:
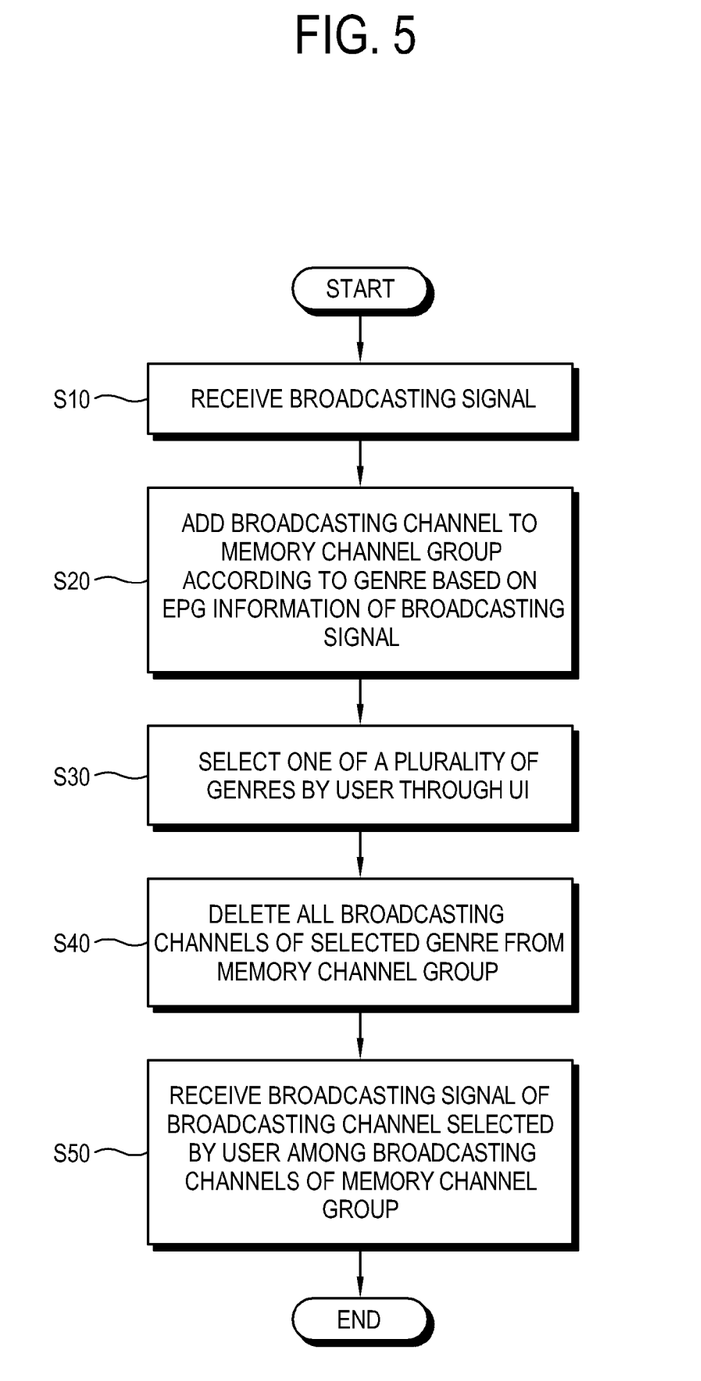
FIG. 5 is a flowchart to describe an operation of the broadcasting receiving apparatus according to the exemplary embodiment of the present invention.

Hereinafter, a control method of the broadcasting receiving apparatus 100 according to the exemplary embodiment of the present invention will be described with reference to FIG. 5.

First, the broadcasting receiving apparatus 100 receives a broadcasting signal (S10). For example, the receiver 110 may receive a broadcasting signal transmitted by a broadcasting station through an antenna or a cable.

The broadcasting receiving apparatus 100 adds the broadcasting channel to the memory channel group according to the genre, based on the additional information of the broadcasting signal (S20). For example, the broadcasting signal may include SI and PSI as the additional information and form the EPG with the SI and PSI. The EPG includes the genre, broadcasting station, synopsis and schedule of the broadcasting program.

The broadcasting receiving apparatus 100 receives a user's input to select one of the plurality of genres through the UI (S30). The broadcasting receiving apparatus 100 deletes all broadcasting channels of the selected genre from the memory channel group (S40).

As shown in FIG. 3, the UI 200 according to the exemplary embodiment of the present invention displays the genre list 210 including genres like the home shopping, movie, entertainment, drama and religion. Each genre includes the plurality of broadcasting channel list 220. The command window 230 is displayed to receive a user's command. If a user selects the genre of home shopping, the broadcasting channel list 220 including home shopping channels is displayed. If a user selects the item "delete all" from the command window 230, all home shopping channels are deleted.

The broadcasting receiving apparatus 100 receives the broadcasting signal of the broadcasting channel selected by a user among the broadcasting channels of the memory channel group (S50). The memory channel group is the database of the viewable broadcasting channels among the plurality of broadcasting channels. That is, the controller 170 controls the receiver 110 to receive the broadcasting signal of the broadcasting channel included in the memory channel group and not to receive the broadcasting signal of the broadcasting channel deleted from the memory channel group.

As described above, the present invention provides a broadcasting receiving apparatus which edits a broadcasting channel more conveniently, and a control method thereof.

Also, the present invention provides a broadcasting receiving apparatus which automatically forms a memory channel group according to a channel category by using additional information included in a broadcasting signal, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting receiving apparatus, comprising:
a receiver which receives a broadcasting signal of at least one of a plurality of broadcasting channels included in a memory channel group, each of the plurality of broadcasting channels belonging to at least one of a plurality of channel categories; and
a user interface generator which generates an optional menu including options of deleting simultaneously all of the broadcasting channels, deleting a part of the broadcasting channels, and restoring the broadcasting channels, which belong to a channel category selected by a user from among the plurality of channel categories, from the memory channel group; and
a controller which controls the receiver to receive the broadcasting signal of at least one of the plurality of broadcasting channels included in the memory channel group belonging to the channel category which was not deleted.

2. The broadcasting receiving apparatus according to claim 1, wherein the user interface (UI) generator generates a UI to select one of the plurality of channel categories by the user.

3. The broadcasting receiving apparatus according to claim 1, wherein the controller adds a part of the plurality of broadcasting channels to the memory channel group according to channel categories of the part of the plurality of broadcasting channels, and wherein additional information included in broadcasting signals of the part of the plurality of broadcasting channels, comprise the channel categories of the part of the plurality of broadcasting channels.

4. The broadcasting receiving apparatus according to claim 1, further comprising a user input unit which receives the user command, wherein the controller selects one of the plurality of channel categories according to the user command.

5. The broadcasting receiving apparatus according to claim 4, wherein the controller adds a part of the plurality of broadcasting channels to the memory channel group according to the user command.

6. The broadcasting receiving apparatus according to claim 1, further comprising a storage unit which stores the memory channel group.

7. The broadcasting receiving apparatus according to claim 1, further comprising an image processor which processes the broadcasting signal.

8. The broadcasting receiving apparatus according to claim 7, further comprising a display unit which displays an image of the broadcasting signal processed by the image processor.

9. The broadcasting receiving apparatus according to claim 1, wherein the controller controls which broadcasting channels belong to the plurality of channel categories based on the user command.

10. The broadcasting receiving apparatus according to claim 1, wherein the optional menu comprises a command window.

11. The broadcasting receiving apparatus according to claim 1, wherein the memory channel group is formed according to the channel category by using electronic program guide (EPG) information included in the broadcasting signal.

12. A control method of a broadcasting receiving apparatus which receives a broadcasting signal of at least one of a plurality of broadcasting channels included in a memory channel group, each of the broadcasting channels belonging to at least one of a plurality of channel categories, the control method comprising:

generating an optional menu including options of deleting simultaneously all of the broadcasting channels, deleting a part of the broadcasting channels, and restoring the broadcasting channels, which belong to a channel category of a same genre selected by a user from among the plurality of channel categories, to be selectively deleted from the memory channel group according to a user command; and receiving the broadcasting signal of at least one of a plurality of broadcasting channels included in the memory channel group, which was not deleted.

13. The control method according to claim 12, wherein the generating a user interface (UI) selects one of the plurality of channel categories by the user.

14. The control method according to claim 12, further comprising adding a part of the plurality of broadcasting channels to the memory channel group according to channel categories of the part of the plurality of broadcasting channels, and wherein additional information included in broadcasting signals of the part of the plurality of broadcasting channels, comprise the channel categories of the part of the plurality of broadcasting channels.

15. The control method according to claim 12, further comprising selecting one of the plurality of channel categories according to the user command.

16. The control method according to claim 15, further comprising adding a part of the plurality of broadcasting channels to the memory channel group according to the user command.

17. The control method according to claim 12, further comprising storing the memory channel group.

18. The control method according to claim 12, further comprising processing the broadcasting signal.

19. The control method according to claim 18, further comprising displaying an image of the processed broadcasting signal.

20. The control method according to claim 12, further comprising adding or deleting at least one of the broadcasting channels from at least one of the channel categories based on the user command.

21. The broadcasting receiving apparatus according to claim 12, wherein the optional menu comprises a command window.

22. The broadcasting receiving apparatus according to claim 12, wherein the memory channel group is formed according to the channel category by using electronic program guide (EPG) information included in the broadcasting signal.

23. A broadcasting receiving apparatus, comprising:

a receiver which receives a broadcasting signal of at least one of a plurality of broadcasting channels and adds the at least one of the plurality of broadcasting channels to at least one of a plurality of channel categories according to genre information based on electronic program guide information of the broadcasting signal, each of the plurality of channel categories belonging to a memory channel group; and a user interface generator which generates an optional menu including options of deleting simultaneously all of the broadcasting channels, deleting a part of the broadcasting channels, and restoring the broadcasting channels, which belong to a channel category selected by a user from among the plurality of channel categories, from the memory channel group; and a controller which selects one of the plurality of channel categories through a user interface and selectively deletes simultaneously all of the broadcasting channels, a part of the broadcasting channels, and restores the broadcasting channels, which belong to a channel category of the memory channel group according to a user command.

* * * * *